United States Patent
Heilig et al.

[19]

[11] Patent Number: 6,039,380
[45] Date of Patent: Mar. 21, 2000

[54] KNEE RESTRAINT DEVICE FOR VEHICLES

[75] Inventors: Alexander Heilig, Wissgoldingen; Dirk Schultz, Schwäbisch Gmünd, both of Germany

[73] Assignee: TRW Occupant Restraitn Systems GmbH & Co. KG, Alfdorf, Germany

[21] Appl. No.: 09/094,954

[22] Filed: Jun. 15, 1998

[30] Foreign Application Priority Data

Jun. 19, 1997 [DE] Germany ................. 297 10 745 U

[51] Int. Cl.⁷ ........................... B62D 25/14
[52] U.S. Cl. ................ 296/70; 280/752; 280/753
[58] Field of Search ................. 296/70; 280/752, 280/753

[56] References Cited

U.S. PATENT DOCUMENTS

| | | | |
|---|---|---|---|
| 4,948,168 | 8/1990 | Adomeit et al. | |
| 5,324,070 | 6/1994 | Kitagawa et al. | 280/752 |
| 5,344,184 | 9/1994 | Keeler et al. | 280/753 |
| 5,524,924 | 6/1996 | Steffens et al. | |
| 5,536,043 | 7/1996 | Lang et al. | |
| 5,775,729 | 7/1998 | Schneider et al. | 280/753 |
| 5,816,613 | 10/1998 | Specht et al. | 280/753 |
| 5,876,061 | 3/1999 | Stavermann | 280/752 |
| 5,895,069 | 4/1999 | Heilig et al. | 280/752 |

FOREIGN PATENT DOCUMENTS

| | | |
|---|---|---|
| 0653335 | 5/1995 | European Pat. Off. . |
| 0684164 | 11/1995 | European Pat. Off. . |
| 3908713 | 10/1989 | Germany . |
| 4-283147 | 10/1992 | Japan . |
| 6-080058 | 3/1994 | Japan . |
| 9815432 | 4/1998 | WIPO . |

OTHER PUBLICATIONS

Side Impact Protection Device, 2244 Research Disclosure (1995) Jul., No. 375, Emsworth, GB.

*Primary Examiner*—Gary Hoge
*Attorney, Agent, or Firm*—Tarolli, Sundheim, Covell, Tummino & Szabo L.L.P.

[57] ABSTRACT

A knee restraint device for vehicles comprises a base, a knee protector component which is movable towards the knees of a vehicle occupant, a drive means which is arranged between the base and the knee protector component, and catching and positioning means which control the movement path of the knee protector component at least in the up/down direction relative to the vehicle and which, in the limit of travel of the drive means, define a predetermined end position of the knee protector component in the space. To provide a knee restraint device which accomplishes the controlling of the movement path and the definition of the end position of the knee protector component and which can be adjusted in a simple manner to various end positions of the knee protector component, the catching and positioning means are arranged outside the drive means and the drive means loosely contacts the knee protector component.

10 Claims, 10 Drawing Sheets

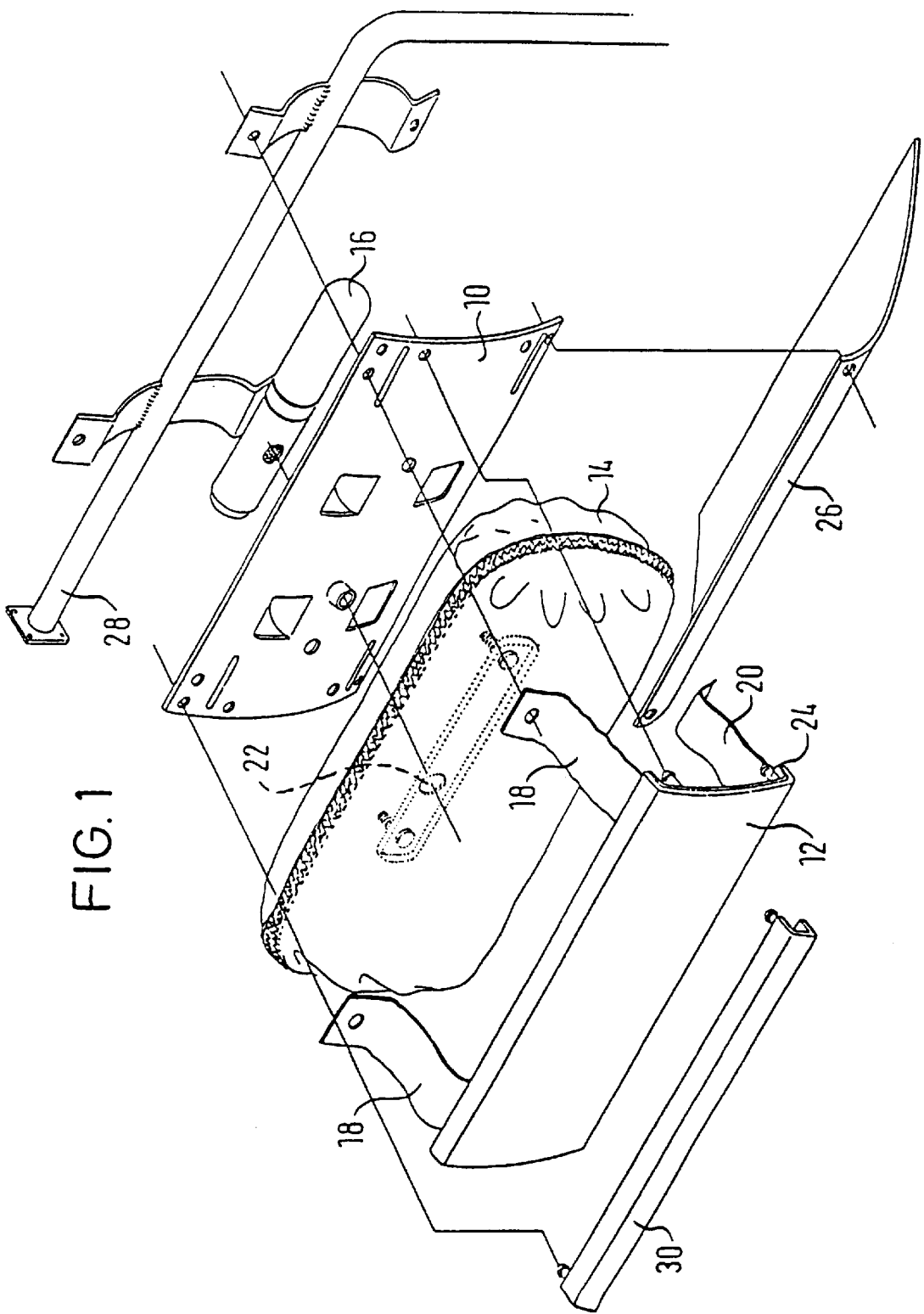

KNEE RESTRAINT DEVICE FOR VEHICLES

FIELD OF THE INVENTION

The invention relates to a knee restraint device for vehicles, with a base and a knee protector component which is movable towards the knees of a vehicle occupant, with a drive means which is arranged between the base and the knee protector component, and with catching and positioning means which control the movement path of the knee protector component at least in the up/down direction relative to the vehicle and which, in the limit of travel of the drive means, define a predetermined end position of the knee protector component in the space.

BACKGROUND OF THE INVENTION

A generic knee restraint device is known from the European published application EP 0 684 164 A1. The knee restraint device described there has a knee protector plate which is movable by a gas bag towards the knees of a vehicle occupant. The gas bag is able to be filled by a gas source and is arranged between the base and the knee protector plate. Tethers serve both to define an end position of the knee protector plate and to control the movement path of the knee protector plate during the unfolding process. The end position here can lie above the initial position of the knee protector plate. The tethers are arranged inside the gas bag. The gas bag is firmly connected with the knee protector plate and with the base, respectively, by means of securing rings. Due to the tethers being arranged inside the gas bag, the possibilities for their attachment are very limited. Also, an altered end position of the knee protector plate necessitates an altered gas bag construction, because the end position of the knee protector plate is commonly defined by the gas bag wall and the tethers. The fastening of the gas bag to the knee protector plate must be made so as to be pressure-tight and tension-proof and is therefore only able to be realized with difficulty.

SUMMARY OF THE INVENTION

The invention is to provide a knee restraint device which accomplishes the controlling of the movement path and the definition of the end position of the knee protector component and which can be adjusted in a simple manner to various end positions of the knee protector component.

According to the invention, this is achieved by a knee restraint device for vehicles, with a base and a knee protector component which is movable towards the knees of a vehicle occupant, and a drive means, the drive means being arranged between the base and the knee protector component. catching and positioning means control the movement path of the knee protector component at least in the up/down direction relative to the vehicle. The catching and positioning means also define a predetermined end position of the knee protector component in the limit of travel of the drive means. The catching and positioning means are arranged outside the drive means and the drive means loosely contacts the knee protector component. The catching and positioning means arranged outside the drive means accomplish the controlling of the movement path and the definition of the end position of the knee protector component. Only the catching and positioning means have to be altered to alter the movement path and the end position of the knee protector component. This can be done without altering the drive means itself. An altered end position of the knee protector component in fact only results in an altered contact surface between the knee protector component and the drive means, because the latter loosely contacts the knee protector component. Conventional springs, gas compression springs or also inflatable gas bags can be used as drive means.

In a further development of the invention, provision is made that the drive means contains an inflatable gas bag and a gas source. As the catching and positioning means are arranged outside the gas bag, an altered end position of the knee protector component or a desired different movement path therefore does not require any modified gas bag blank. As the gas bag also only loosely contacts the knee protector component, even with altered catching and positioning means the bag's uniform unfolding is ensured.

In a further development of the invention, provision is made to provide the catching and positioning means as tethers. Tethers can be produced in a simple manner and at favourable costs and only require a small amount of space in the state of rest of the knee restraint device.

In another preferred embodiment of the invention, provision is made to construct the catching and positioning means as a net which extends over the entire width of the knee protector component. The considerable forces which act on the catching and positioning means during the controlling of the movement path and the operation of defining the end position of the knee protector component, can in this way be distributed over the entire width of the knee protector component, so that the attachment means and the knee protector component itself are stressed more uniformly.

According to a further embodiment of the invention, the catching and positioning means are provided as pivotally mounted guide arms. Pivotably mounted guide arms allow a more precise control of the movement path of the knee protector component during the extension process than with the use of tethers or cables.

In a further development of the invention, at least two guide arms are provided which are arranged like a parallelogram. Due to the arrangement of the guide arms in the form of a parallelogram, a desired movement path of the knee protector component can be realised in a simple manner, which path starting from the position of rest is directed obliquely upwards or downwards.

According to a further embodiment of the invention, the base is arranged on a movable front face of a glove compartment. Hereby, a knee restraint device can be realized without impairing the function of an existing glove compartment. In addition, the knee restraint device can be exchanged as a module in a simple manner for a conventional front face of a glove compartment.

Advantageously, the front face of the glove compartment is formed as a flap and the gas generator and the gas bag are in communication with each other by a pipe line. The pipe line is arranged here in the swivel axis of the flap. Such a further development permits a separate spatial arrangement of the gas generator and the movable front face of the glove compartment. On the one hand, this protects the gas generator from too impetuous a movement on opening and closing of the glove compartment, because for example it can be firmly secured to a suitable section of the vehicle structure. On the other hand, the flap can be designed flatter, which is of advantage to the size of the glove compartment. The use of the pipe line as a hinge axis for the flap is likewise possible.

According to a further embodiment of the invention, provision is made to arrange the knee protector component behind a lining which is capable of being torn out. In this way, the knee restraint device can be integrated invisibly into the instrument lining, and the knee protector component can be provided with an optimal surface for the knee protector function independently of visual requirements for the interior of the vehicle.

Another embodiment of the invention is characterized in that the knee protector component is formed as a glove box, the front side of which forms a knee protector plate and the rear side of which faces the gas bag. Here also, the advantages of a knee restraint device can be realized without the storage space of the glove compartment being lost.

In a further development of the invention, the catching and positioning means are formed as rollers or sliders with suitable guides. Rollers or sliders with suitable guides can guide the glove box both on manual extraction and on activation of the knee restraint device. The guides here can be constructed in a straight line or in a curved shape, in order to control the movement path of the glove box and to define its end position.

BRIEF DESCRIPTION OF THE DRAWINGS

Preferred embodiments of the invention are described hereinbelow with reference to the drawing, in which:

FIG. 1 shows an exploded view of a first embodiment of a knee restraint device according to the invention.

DESCRIPTION OF THE PREFERRED EMBODIMENTS

Figure 2A:
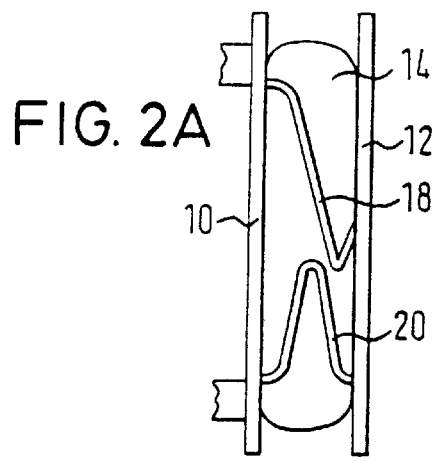
FIGS. 2A to 2C show diagrammatic side views of the knee restraint device of FIG. 1 to illustrate the movement path after activation of the knee restraint device.

The knee restraint device of FIG. 1 has a base plate 10 and a knee protector component which is constructed as a knee protector plate 12. A gas bag 14 is arranged as a drive means between the base plate 10 and the knee protector plate 12. A gas generator 16 serves for filling the gas bag 14 and is actuated by a conventional actuating mechanism. For the purpose of connecting the knee protector plate 12 to the base plate 10, upper tethers 18 and lower tethers 20 are provided, which are arranged outside the gas bag 14. The gas bag 14 is connected with the base plate 10 in the region of its inflation opening 22, but only loosely contacts the knee protector plate 12. In its initial position, the knee protector plate 2 is held against the base plate 10 by holding pins 24 which are capable of being torn out, adjoining which base plate 10 there is also an inner lining 26. The base plate 10 is supported by a carrier 28 which is part of the vehicle structure. In order to ensure a flush transition from the knee protector plate 12 to the inner lining above the knee protector plate 12, a trim strip 30 is likewise fastened to the base plate 10.

On activation of the gas generator 16, the latter fills the gas bag 14 via the inflation opening 22. As the gas bag 14 is arranged between the base plate 10 and the knee protector plate 12, the holding pins 24 tear out and the knee protector plate 12 moves away from the base plate 10 towards the knees of a vehicle occupant. In this arrangement, the upper tethers 18 are provided such that they are already taut shortly after activation of the gas generator 16. Therefore, on further filling of the gas bag 14 in the region of the fastening of the upper tethers 18, the knee protector plate describes a circular path around the fastening points of the upper tethers 18 on the base plate 10. The lower tethers 20 are only tensioned on reaching the end position of the knee protector plate 12. Starting from its initial position, the knee protector plate 12 accordingly describes a movement path directed obliquely upwards, which is defined by the length and the fastening points of the tethers 18, 20. The gas bag 14 serves here merely as a drive means for the knee protector plate 12, and the obliquely upwardly directed motion of the knee protector plate 12 is controlled exclusively by the tethers 18, 20. The end position and the movement path of the knee protector plate 12 can therefore be adjusted in a simple manner. Without having to modify the gas bag 14, the length and the fastening points of the tethers 18, 20 are altered for this purpose. As the gas bag 14 merely loosely contacts the knee protector plate 12 and the contact surface can shift accordingly, an altered end position of the knee protector plate 12 does not impede the uniform unfolding of the gas bag 14. The adaptation of the knee restraint device to various installation positions or vehicle types is therefore possible in a simple manner.

Figure 2B:
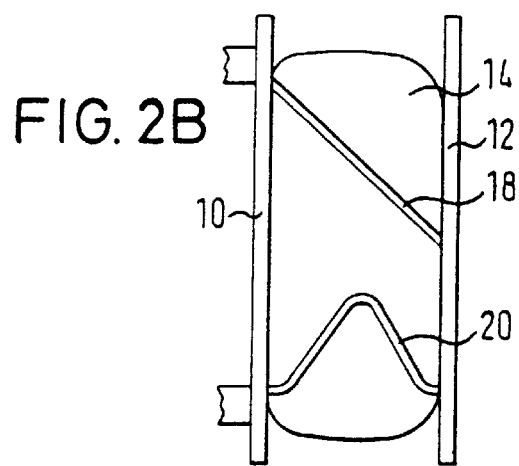
Figure 2C:
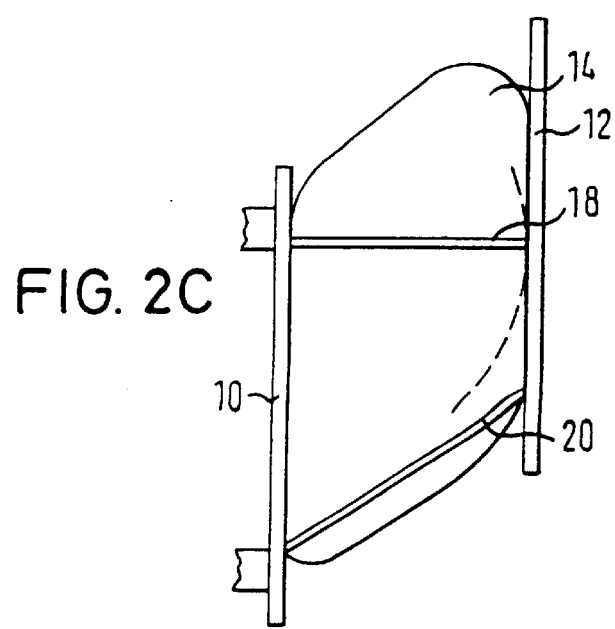

In FIGS. 2A to 2C, the movement path of the knee restraint device of FIG. 1 is illustrated by diagrammatic side views. In FIG. 2A, the knee protector plate 12 is situated in its initial position before activation of the gas generator. The gas bag 14 is arranged in folded state between the knee protector plate 12 and the base plate 10. The upper tether 18 is fastened in the upper region of the base plate 10 and in the central region of the knee protector plate 12. The lower tether 20 is fastened both to the base plate 10 and to the knee protector plate 12 in the lower region. In the initial position of FIG. 2A, the tethers 18 and 20 are not taut. After activation of the knee restraint device, the gas bag 14 expands and moves the knee protector plate 12 away from the base plate 10. The upper tether 18, as shown in FIG. 2B, is already taut shortly after leaving the initial position. The lower tether 20, on the contrast, is not yet taut. On further filling and expanding of the gas bag 14, the fastening point of the upper tether 18 on the knee protector plate 12 moves along a circular path, the radius of which is given by the length of the upper tether 18 and which is indicated by a dotted line in FIG. 2C. During this upwardly directed motion, the knee protector plate substantially maintains its upright position because the forces applied onto the knee protector plate 12 by the expanding gas bag are substantially equal in extent above and below the fastening point of the tether 18 on the knee protector plate 12. The movement of the knee protector plate 12 is stopped in its end position, illustrated in FIG. 2C, by the lower tether 20, which is in taut state in this end position of the knee protector plate.

Figure 3:
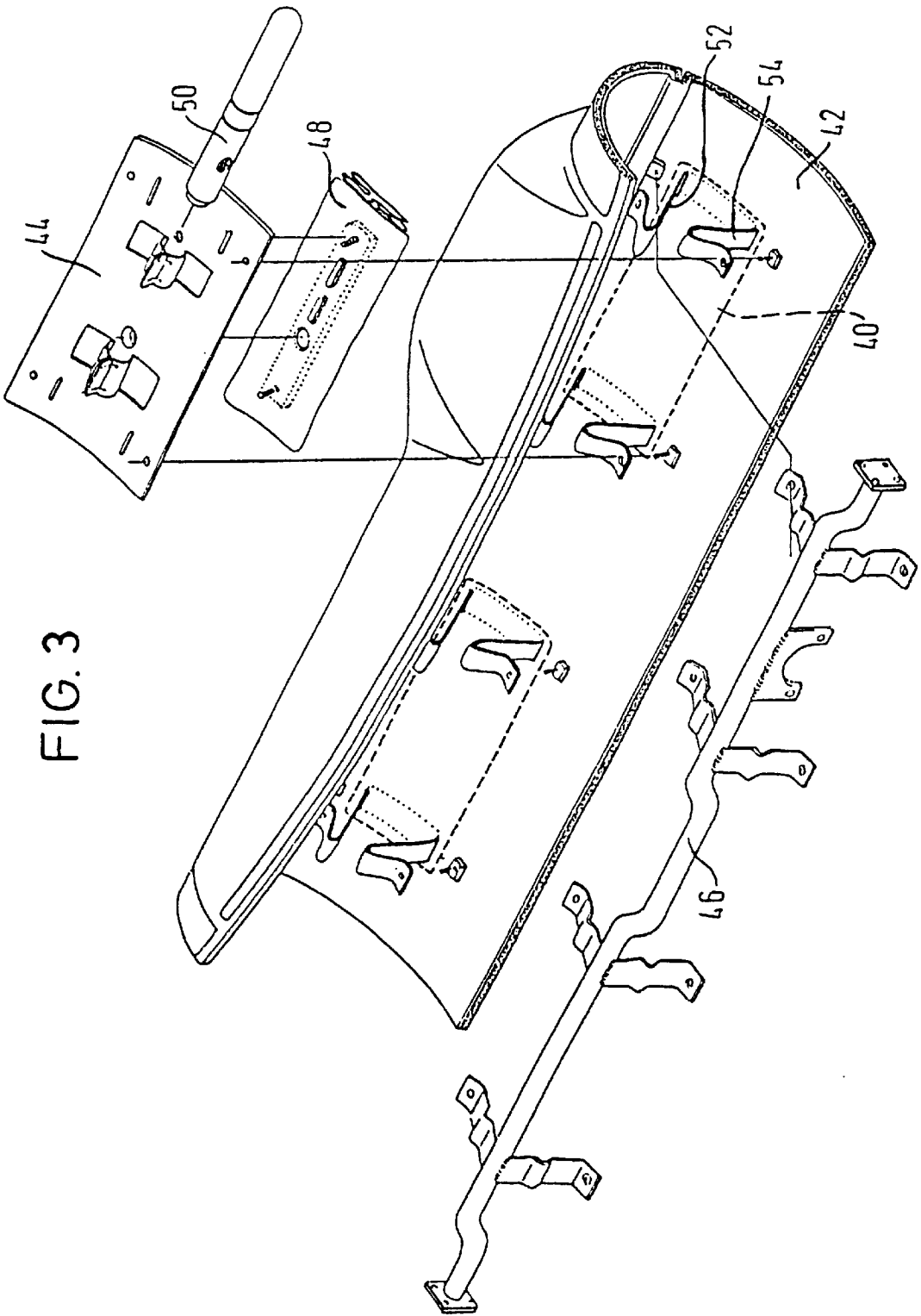
FIG. 3 shows an exploded view of a second embodiment of the knee restraint device according to the invention.

FIG. 3 shows a second embodiment of the knee restraint device according to the invention. Here, also, the knee protector component has the form of a knee protector plate 40 which is constructed in one piece with an instrument carrier 42. The knee protector plate 40 is delimited by a tearable predetermined breaking site with respect to the instrument carrier 42. A base plate 44 is fastened to the instrument carrier 42. The instrument carrier 42 and the base plate 44 are jointly supported by means of a carrier 46 and are connected with the structure of the vehicle. Between the base plate 44 and the knee protector plate 40, a gas bag 48 is arranged, which is filled by a gas generator 50. By folding over four tongues which are punched out in the base plate 44, the gas generator 50 is connected to said base plate 44. On activation of the gas generator 50, the gas bag 48 fills and exerts a force, directed away from the base plate 44, onto the knee protector plate 40. In so doing, the predetermined breaking site surrounding the knee protector plate 40 tears out, so that the knee protector plate 40 can move towards the knees of a vehicle occupant. The knee protector plate 40 is controlled here by upper tethers 52 and lower tethers 54. The tethers 52 and 54 of a respective side of the knee protector plate 40 consist of a single band placed between the layers of the knee protector plate 40, the plate being constructed in two layers.

During the manufacturing process of the instrument carrier 42 and of the knee protector plate 40, a secure fastening of the tethers 52, 54 to the knee protector plate 40 can be achieved in a simple manner. The controlling of the movement path and the definition of the end position of the knee protector plate 40 is effected here by the upper tethers 52, which are already taut shortly after activation of the gas generator 50.

Figure 4:
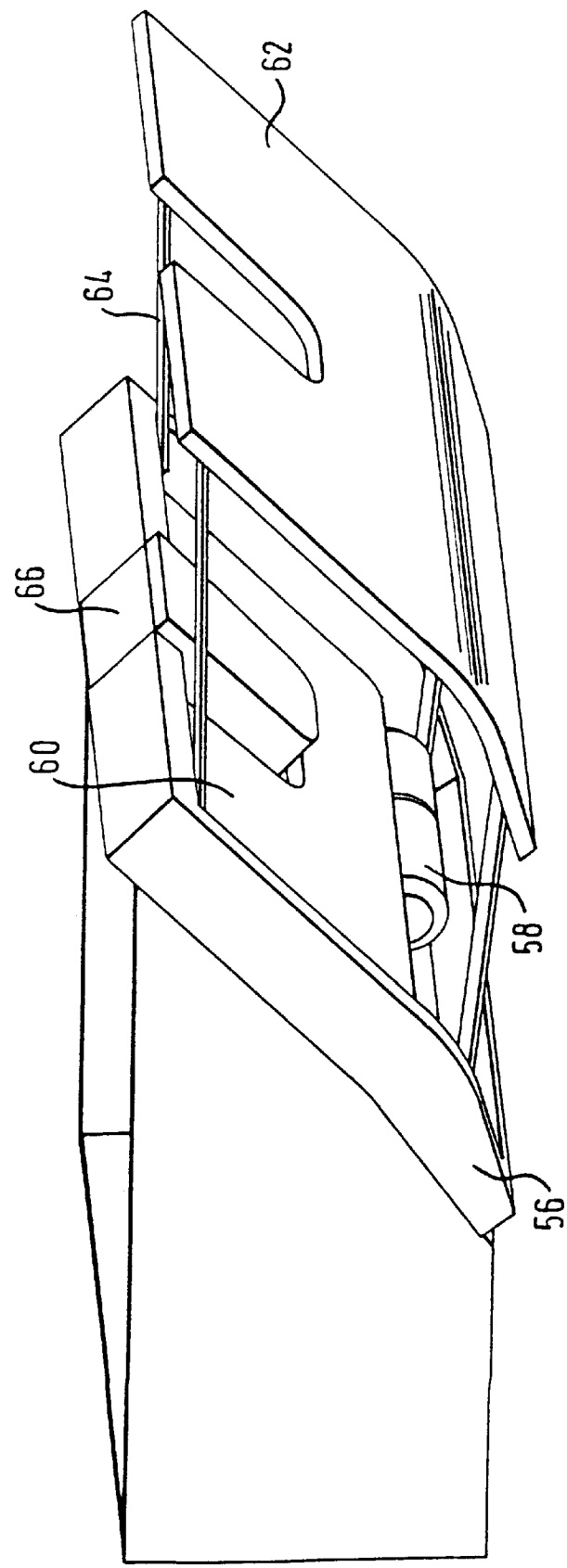
FIG. 4 shows a perspective view of a third embodiment of the invention.

The knee restraint device of FIG. 4 is arranged in the movable front face of a glove compartment. The front face is formed as a flap 56. The flap 56 also serves as a base plate for the knee restraint device, and a gas generator 58 and a gas bag 60 are arranged on the flap. For greater clarity, in FIG. 4 a knee protector plate 62 is illustrated in its end position facing the knees of a vehicle occupant. In its position of rest, the knee protector plate 62 terminates flush with the frame of the flap 56 and forms a part of the inner lining. Tethers 64 connect the flap 56, used as base plate, to the knee protector plate 62. The flap 56 is held in its position of rest by means of a closure 66 on a vehicle structure or inner lining and can be tilted about its side lying opposite the closure 66 in order to open the glove compartment. In the state of rest, the knee protector plate 62 can be held against the flap 56 by fastenings which are capable of being torn out. On activation of the gas generator 58, the gas bag 60 rests between the flap 56 and the knee protector plate 62, and moves the knee protector plate 62 controlled by the tethers 64 towards the knees of the vehicle occupant.

Figure 5:
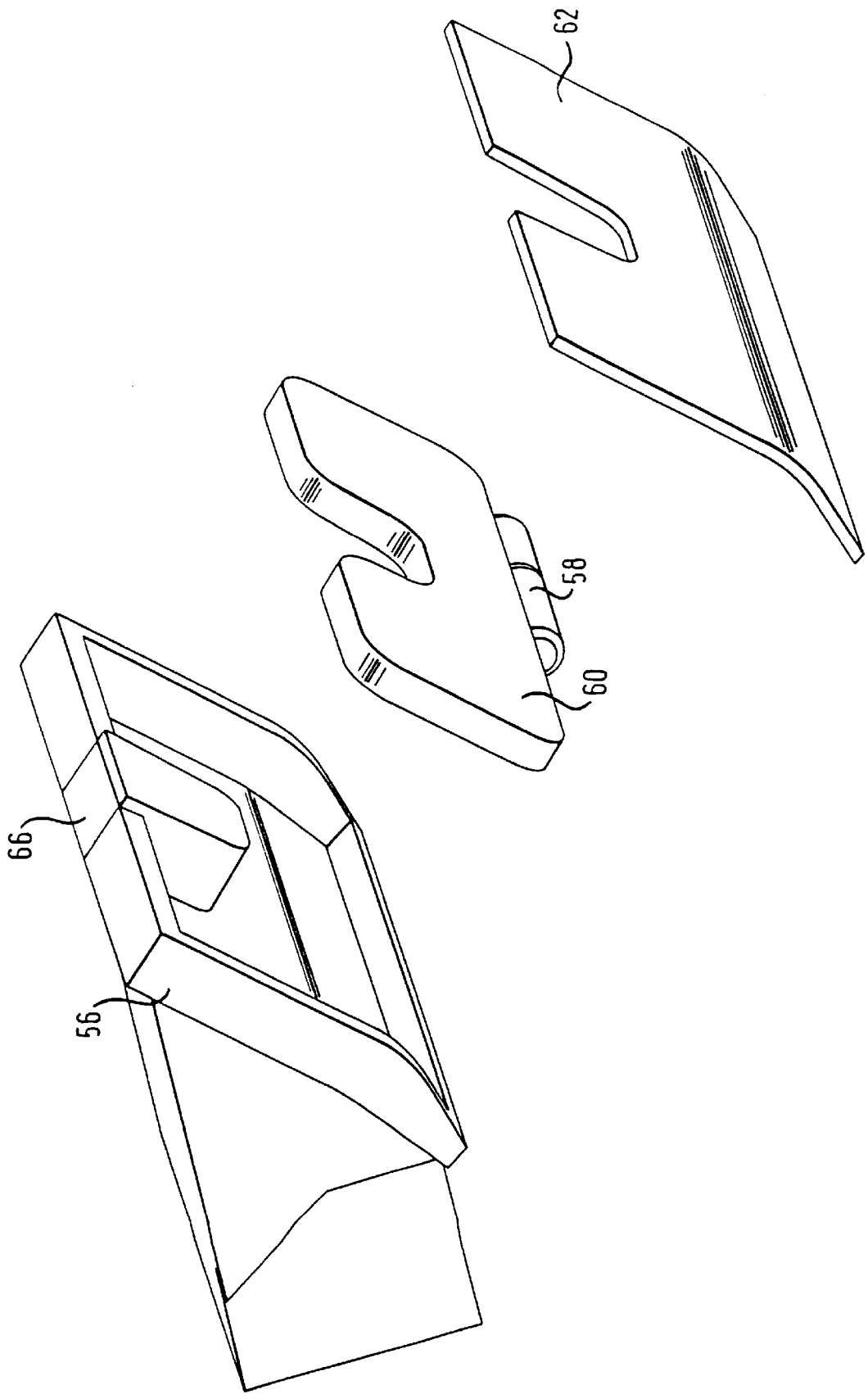
FIG. 5 shows an exploded view of the knee restraint device of FIG. 4.

FIG. 5 shows an exploded view of the knee restraint device of FIG. 4. The flap 56 has in its upper region the closure 66 which extends up to the outer surface of the instrument lining, so that it can be actuated by the vehicle occupant. For this reason the gas bag 60 and the knee protector plate 62 are provided with a recess in the region of the closure 66, so that the latter can be actuated and does not impair the unfolding of the gas bag 60 and the movement of the knee protector plate 62.

Figure 6:
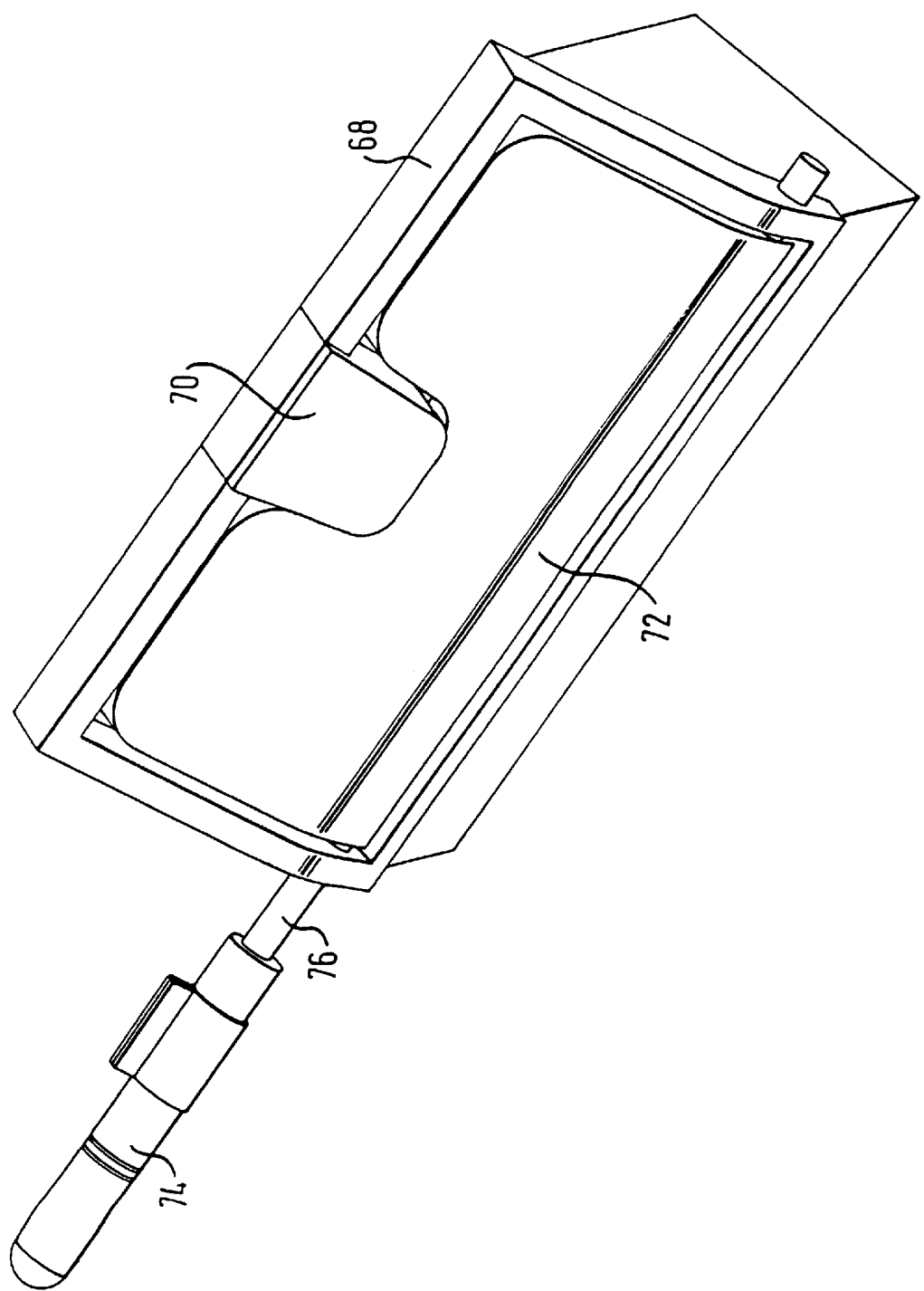
FIG. 6 shows a perspective view of a fourth embodiment of the invention.

The embodiment of FIG. 6 likewise has a flap 68 of a glove compartment, which serves as a base plate for the knee restraint device. As in the embodiment of FIGS. 4 and 5, the flap 68 is provided with a closure 70. The knee protector plate 72 is likewise provided with a recess in the region of the closure 70, and a gas bag is arranged between the flap 68 and the knee protector plate 72. In this embodiment, a gas generator 74 is arranged outside the flap 58 and fills the gas bag via a pipe line 76. The pipe line 76 is arranged in the swivel axis of the flap 68 and serves, at the same time, as a hinge axis.

Figure 7:
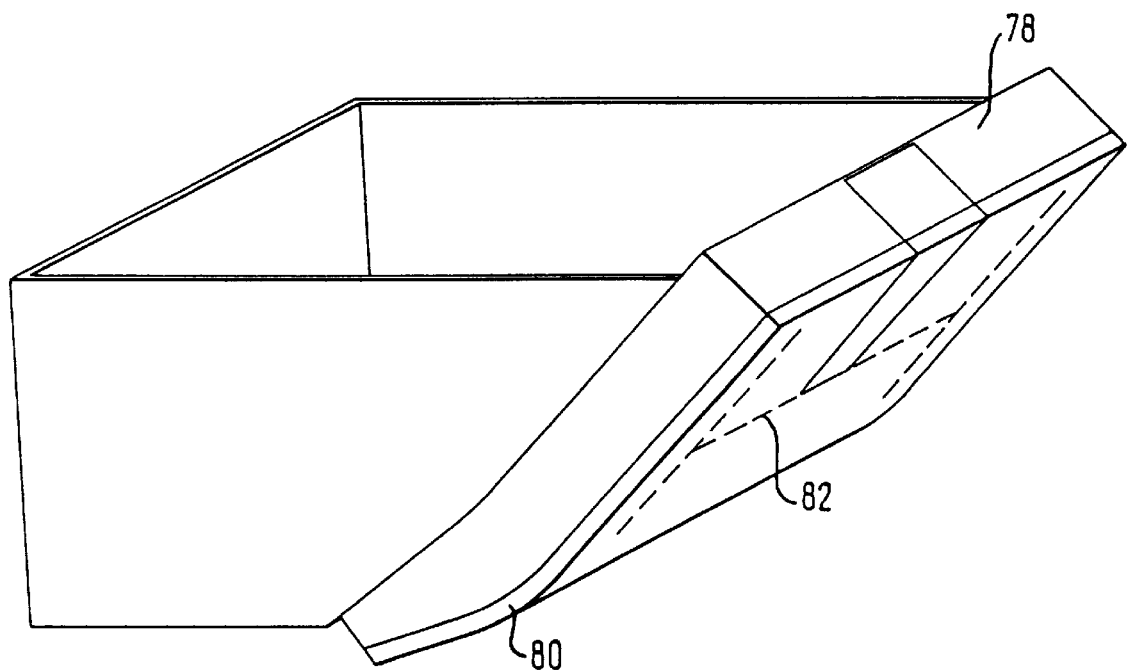
FIG. 7 shows a perspective view of a fifth embodiment of the invention.

In FIG. 7 a further embodiment of the invention is illustrated, wherein the gas bag, the gas generator and the knee protector component are arranged inside a glove compartment flap 78. The glove compartment flap 78 has a lining 80 on its face facing the interior of the vehicle, which lining 80 is provided with predetermined breaking sites 82. After activation of the gas generator, the predetermined breaking sites 82 tear open and the knee protector component moves unimpeded towards the knees of a vehicle occupant.

Figure 8:
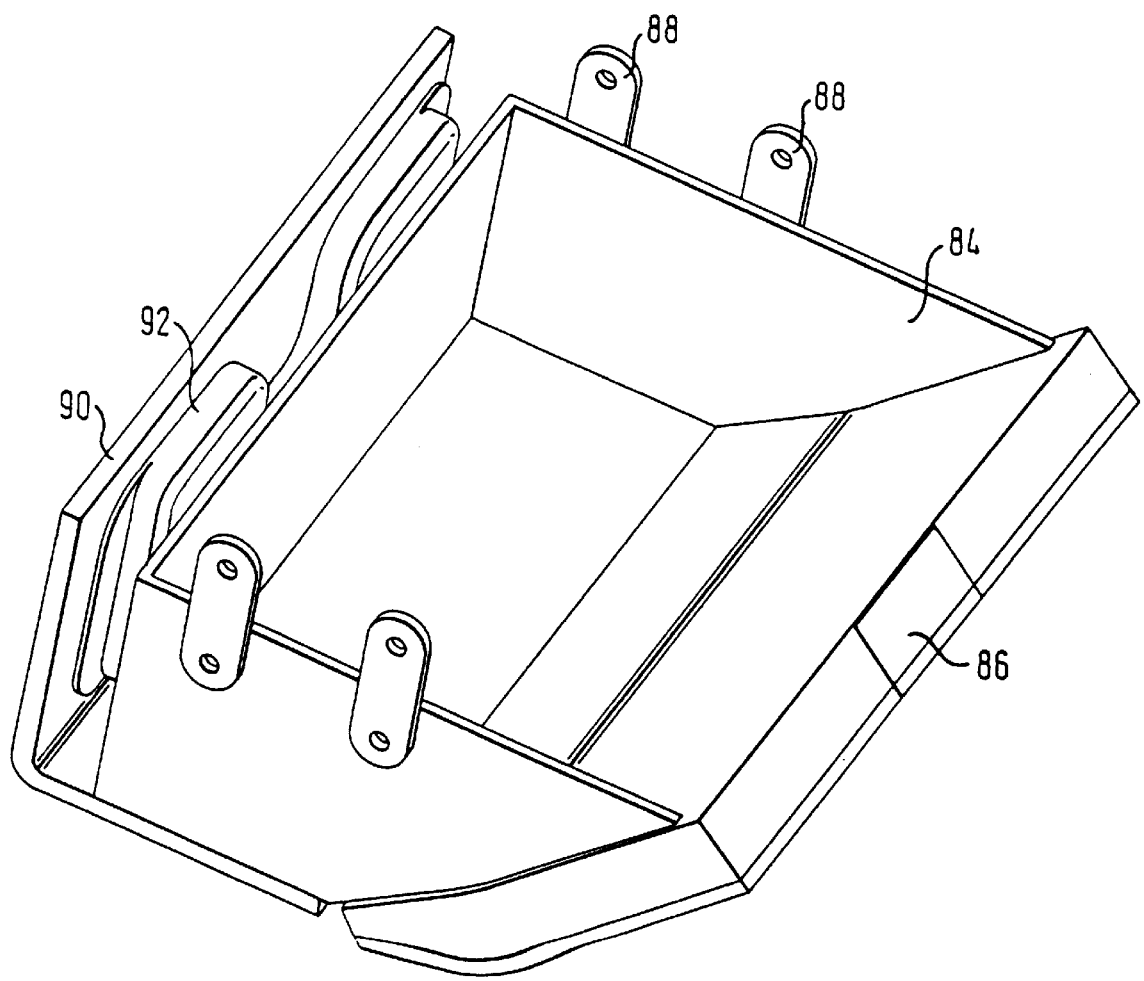
FIG. 8 shows a perspective view of a sixth embodiment of the invention.

The embodiment of the invention illustrated in FIG. 8 is provided with a knee protector component which is formed as a glove box 84. A closure 86, which is arranged on the face of the glove box 84 which faces the interior of the vehicle, serves for opening and closing the glove box 84. The glove box 84 is guided by four guide arms 88 which are arranged like a parallelogram and also serve as catching and positioning means on activation of the knee restraint device. The guide arms 88 are connected on the one hand to the glove box 84 and on the other hand to the vehicle structure, not illustrated here. A gas bag 92 is arranged between the rear face of the glove box 84 and a base 90. If the gas bag 92 is filled, it moves the glove box 84 towards the knees of a vehicle occupant, by abutting between the base 90 and the rear face of the glove box 84. In this arrangement, the closure 86 is constructed such that it does not withstand the high shearing force, produced on filling of the gas bag 90, and releases the glove box 84.

Figure 9:
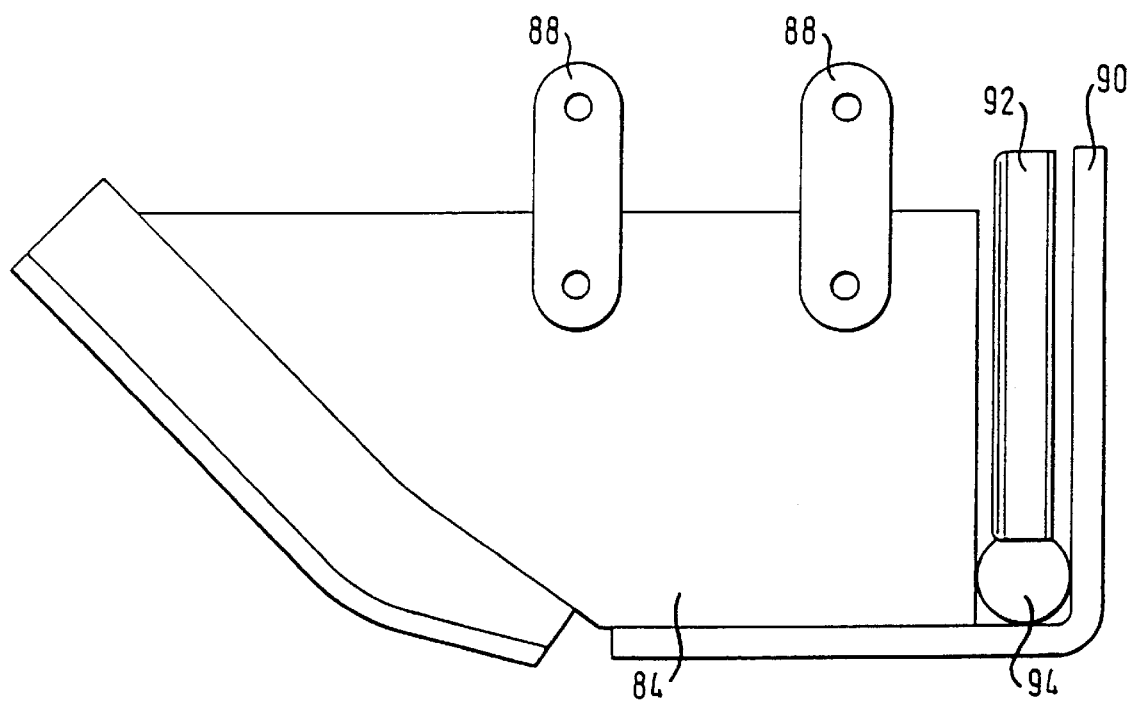
FIG. 9 shows a side view of the knee restraint device of FIG. 8, and FIGS. 10A to 10C show diagrammatic side views of a seventh embodiment of the knee restraint device according to the invention.

FIG. 9 shows a side view of the knee restraint device of FIG. 8. It can be readily seen that the gas bag 92 is arranged between the glove box 84 and the base 90 above a gas generator 94. After activation of the gas generator 94, the gas bag 92 fills and moves the glove box 84 to the left in FIG. 9. The movement path of the glove box 84 is defined here by the guide arms 88 and owing to the parallelogram-like arrangement of the guide arms 88 it leads to the left upwards in the plane of FIG. 9. In the vehicle, such a movement results in a motion directed obliquely upwards, towards the interior of the vehicle, and the front face of the glove box 84 thereby is, until its end position is reached, in a favourable angle for the impact of the knees of a vehicle occupant.

Figure 10A:
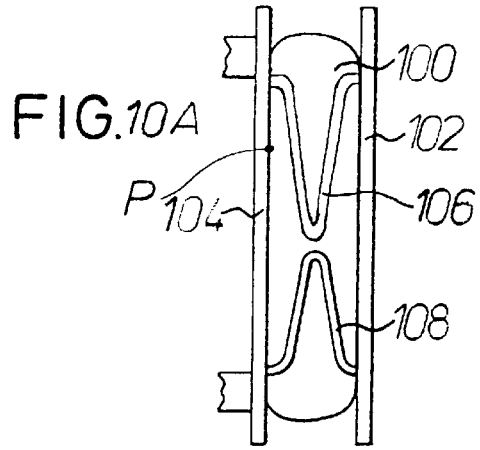
Figure 10B:
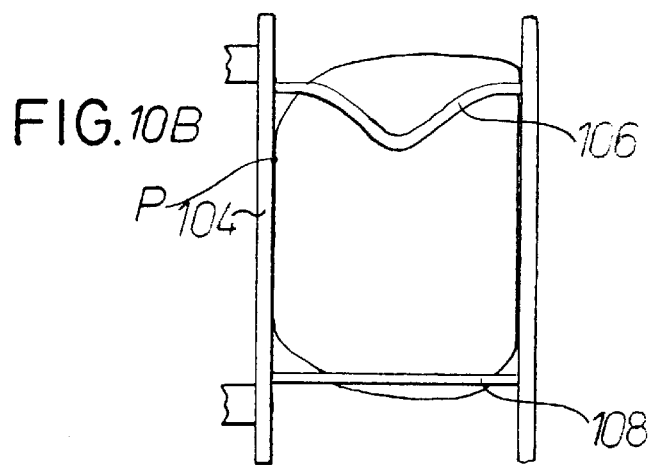
Figure 10C:
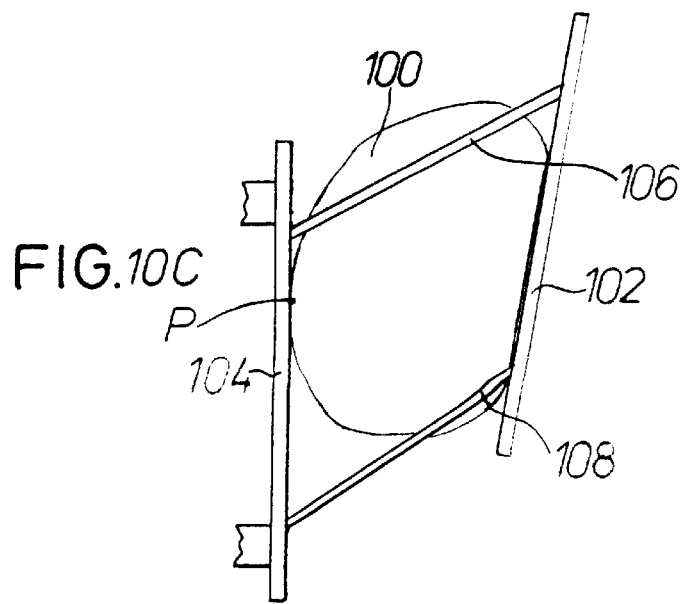

A further embodiment of the knee restraint device according to the invention is diagrammatically shown in FIG. 10A to 10C. A gas bag 100 is arranged between a knee protector plate 102 and a base plate 104 which is connected to a vehicle structure, only partly shown.

Knee protector plate 102 and base plate 104 are connected by at least one upper tether 106 and at least one lower tether 108. If the gas bag 100 is not deployed, as shown in FIG. 10A, neither the upper tether 106 nor the lower thether 108 are taut. The gas bag 100 is connected to the base plate 104 at a point P lying above the center of the base plate 104. During deployment of the gas bag 100, as shown in FIG. 10B, first the lower tether 108 is taut.

In the end position of the knee protector plate 102 shown in FIG. 10C, both tethers 106 and 108 are taut. Due to the greater length of the upper tether 106 relative to the length of the lower tether 108, the end position of the knee protector plate 102 is inclined against the vertical direction. Furthermore, the knee protector plate 102 is, compared to its initial position, upwardly displaced. This upward displacement of the knee protector plate 102 is caused by the cooperation of the gas bag 100 and the tethers 106 and 108. During filling of the gas bag 100, the latter is aligned due to its substantially cylindrical form in a way that the gas bag 100 touches the base plate 104 only in an area which is symmetric to a line running through point P and being perpendicular to the drawing plane of FIG. 10. Since the fastening point of the gas bag 100 to the base plate 104 is positioned above the center of the base plate 104, the gas bag 100 is upwardly displaced compared to its initial position, the movement of the knee protector plate 102 thereby also being provided with an upward component.

We claim:

1. A knee restraint device for vehicles, comprising:
a base, a knee protector component which is movable towards the knees of a vehicle occupant, a drive means which is arranged between said base and said knee protector component, and catching and positioning means which control a movement path of said knee protector component at least in an up/down direction relative to the vehicle and which, in limits of travel of said drive means, define a predetermined end position of said knee protector component in space, wherein said catching and positioning means are arranged outside said drive means and said drive means loosely engages said knee protector component.

2. The knee restraint device according to claim 1, wherein said drive means is provided with an inflatable gas bag and a gas source.

3. The knee restraint device according to claim 1, wherein said catching and positioning means are provided as tethers.

4. The knee restraint device according to claim 1, wherein said catching and positioning means are provided as pivotally mounted guide arms.

5. The knee restraint device according to claim 4, wherein at least two guide arms are provided which are arranged in the manner of a parallelogram.

6. The knee restraint device according to claim 1, wherein said knee protector component is arranged behind a lining which is capable of being torn out.

7. The knee restraint device according to claim 2, wherein said catching and positioning means are tethers.

8. A knee restraint device for vehicles, comprising:
a base;
a knee protector component which is movable towards the knees of a vehicle occupant;
a drive means which is arranged between said base and said knee protector component; and
a catching and positioning means which control a movement path of said knee protector component at least in an up/down direction relative to the vehicle and which, in limits of travel of said drive means, define a predetermined end position of said knee protector component in space, wherein said catching and positioning means are arranged outside said drive means and said drive means loosely engages said knee protector component, and wherein said base is arranged on a movable front of a glove compartment.

9. The knee restraint device according to claim 8, wherein a front face of said glove compartment is formed as a flap, said drive means is provided with a gas source and a gas bag, said gas source and said gas bag are in communication with each other by a pipe line and said pipe line is arranged in a swivel axis of said flap.

10. A knee restraint device for vehicles, comprising:
a base;
a knee protector component which is movable towards the knees of a vehicle occupant;
a drive means which is arranged between said base and said knee protector component; and
catching and positioning means which control a movement path of said knee protector component at least in an up/down direction relative to the vehicle and which, in limits of travel of said drive means, define a predetermined end position of said knee protector component in space, wherein said catching and positioning means are arranged outside said drive means and said drive means loosely engages said knee protector component, and wherein said knee protector component is formed as a glove box, a front face of which forms a knee protector plate and a rear face of which faces said drive means.

* * * * *